United States Patent
Welnick et al.

(10) Patent No.: US 7,433,331 B2
(45) Date of Patent: Oct. 7, 2008

(54) CIRCUIT AND METHOD FOR ADAPTING TO REVERSE LINK LIMITED CHANNELS

(75) Inventors: William E. Welnick, Poway, CA (US);
William P. Alberth, Jr., Crystal Lake, IL (US); Joey Chou, Piscataway, NJ (US);
David J. Krause, Hainesville, IL (US);
Brian D. Storm, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 924 days.

(21) Appl. No.: 10/689,476

(22) Filed: Oct. 20, 2003

(65) Prior Publication Data

US 2005/0083871 A1    Apr. 21, 2005

(51) Int. Cl.
*H04Q 7/00*    (2006.01)
*H04B 7/216*    (2006.01)
*H04Q 7/20*    (2006.01)

(52) U.S. Cl. .................. 370/328; 370/342; 455/552

(58) Field of Classification Search ............... 370/328, 370/335, 448, 342, 318, 312, 280, 208, 480, 370/241, 466, 329, 341, 431, 441; 455/67.11, 455/115, 522, 515, 69, 434, 59, 103, 137, 455/67, 101, 562, 561, 117, 226, 510, 552, 455/273, 454; 709/238, 230; 375/260, 349
See application file for complete search history.

(56) References Cited

U.S. PATENT DOCUMENTS

| | | | |
|---|---|---|---|
| 5,889,768 A | 3/1999 | Storm et al. | |
| 6,011,978 A * | 1/2000 | Ault et al. | 455/552.1 |
| 6,085,085 A | 7/2000 | Blakeney, II et al. | |
| 6,160,799 A | 12/2000 | Krause et al. | |
| 6,252,865 B1 * | 6/2001 | Walton et al. | 370/335 |
| 6,463,298 B1 * | 10/2002 | Sorenson et al. | 455/552.1 |
| 6,466,802 B1 | 10/2002 | Blakeney, II et al. | |
| 6,470,182 B1 | 10/2002 | Nelson | |
| 6,483,817 B1 * | 11/2002 | Antonio et al. | 370/328 |
| 6,571,110 B1 * | 5/2003 | Patton et al. | 455/561 |
| 6,614,771 B1 * | 9/2003 | Kim et al. | 370/335 |
| 2002/0082032 A1 * | 6/2002 | Hunzinger | 455/510 |
| 2003/0021255 A1 * | 1/2003 | Harris | 370/342 |
| 2003/0086396 A1 | 5/2003 | Gurski et al. | |
| 2004/0132402 A1 * | 7/2004 | Agashe et al. | 455/3.01 |

* cited by examiner

*Primary Examiner*—Wing F. Chan
*Assistant Examiner*—Prenell P Jones
(74) *Attorney, Agent, or Firm*—Vedder Price PC

(57) ABSTRACT

A circuit (2) and method employing logic circuitry (30) and memory (40) identifies a reverse link limited channel (80). The logic circuitry (30) identifies a reverse link limited channel based on determining that an access probe failure occurred on a channel (64). The logic circuitry (30) causes the memory to store reverse link limited channel data (80) in response to the logic circuitry (30) determining that the access probe failure occurred. The reverse link limited channel data (80), for example, may be a channel identification associated with the channel (64), a base station identification associated with the channel (64), a location identification of the circuit (2) or any data suitable for identifying and adapting dynamically to the reverse link limited channel.

22 Claims, 2 Drawing Sheets

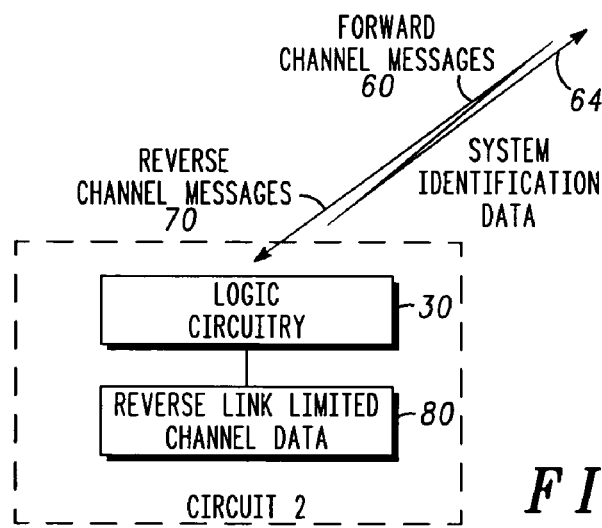
FIG. 1
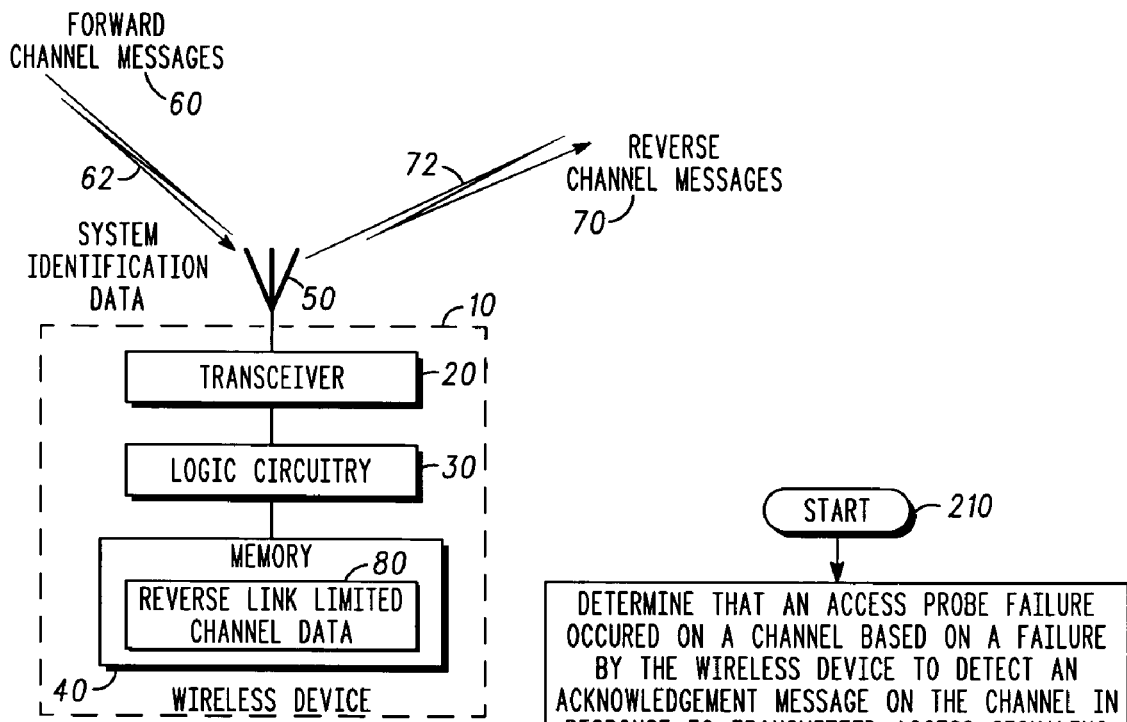
FIG. 3
FIG. 2

CIRCUIT AND METHOD FOR ADAPTING TO REVERSE LINK LIMITED CHANNELS

FIELD OF THE INVENTION

The invention relates generally to wireless communication devices and methods and, more particularly, to a wireless device and method for acquiring service on wireless communication systems.

BACKGROUND OF THE INVENTION

A wireless communication system comprises a number of base stations, distributed over a geographic area, to provide service for a number of wireless devices, such as personal digital assistants (PDA), cellular phones, portable computers and other suitable devices that can move throughout the geographic area. A problem with the wireless device exists when there are regions of interference or coverage holes in the service area, resulting in the loss of communication on the forward or reverse channel. A coverage hole is an area within the serving area of the service provider in which a wireless device cannot receive acceptable service from the serving base station. For example, there may be a geographic area for which, because of terrain and building clutter, weak service or no service at all is available (e.g., a geographic coverage hole). Additionally, regions of interference within the coverage area may exist in areas where one or more transmitters interfere with the transmit signal of another wireless device. For example, in densely populated urban areas, wireless devices may transmit excessive interference on the reverse channel. When the wireless device moves through a coverage hole or an interference region, it is often the case that the wireless device will emerge from the coverage hole within a short period of time.

Another hindrance to wireless service is known as the unbalanced link problem. In the art, a propagation path loss on the forward channel (base station to wireless device) is generally assumed to track with the propagation path loss on the reverse link (wireless device to base station). However, due to, for example, varying levels of interference on the forward and reverse channel and the complexities of network planning, the forward and reverse channels may be somewhat imbalanced at times. Occasionally the forward channel is impaired more then the reverse channel. This condition is generally referred to as being "forward channel limited."

The forward channel may be strong enough that it is receivable by the wireless device in some localized areas, whereas the base station is not able to receive the reverse channel messages transmitted by the wireless device. This latter condition is generally referred to as being "reverse link limited." A reverse link limited condition might also be caused by an interference region, a coverage hole, or perhaps because the service provider has increased the effective radiated power (ERP) of the base station in order to overcome interference by other nearby base stations belonging to a competing system. Nevertheless, the forward channel may still be strong enough in this case to be successfully demodulated by the wireless device. In this reverse link limited situation, the wireless device would be unable to acknowledge a page, unable to originate a call, or even register with the CDMA base station, even though a satisfactory service indication is displayed.

According to one method, upon a failure of communication with a current communication system, the wireless device attempts to acquire one of the less preferred communication systems. The wireless device attempts acquisition according to a list of preferred communication systems in a preferred roaming list (PRL), upon a communication failure with the current communication system.

According to another method, upon a failure of communication with a current communication system, the wireless device attempts to re-register with the current communication system. However, if the network fails to acknowledge the registration attempts, the wireless device will continue to attempt to register on the reverse link limited channel. As a result, the wireless device may again experience a lack of service each time the wireless device travels through the area experiencing the reverse link limited channel.

BRIEF DESCRIPTION OF THE DRAWINGS

The present invention is illustrated by way of example, and not limitation, in the accompanying figures, in which like reference numerals indicate similar elements, and in which:

FIG. 1 is a block diagram illustrating one example of a wireless device for identifying a reverse link limited channel according to one embodiment of the invention;

FIG. 2 is a flow chart illustrating one example of a method for identifying a reverse link limited channel according to one embodiment of the invention;

FIG. 3 is a flow chart illustrating another example of a method for identifying a reverse link limited channel according to another embodiment of the invention.

DETAILED DESCRIPTION OF THE PREFERRED EMBODIMENTS

Figure 4:
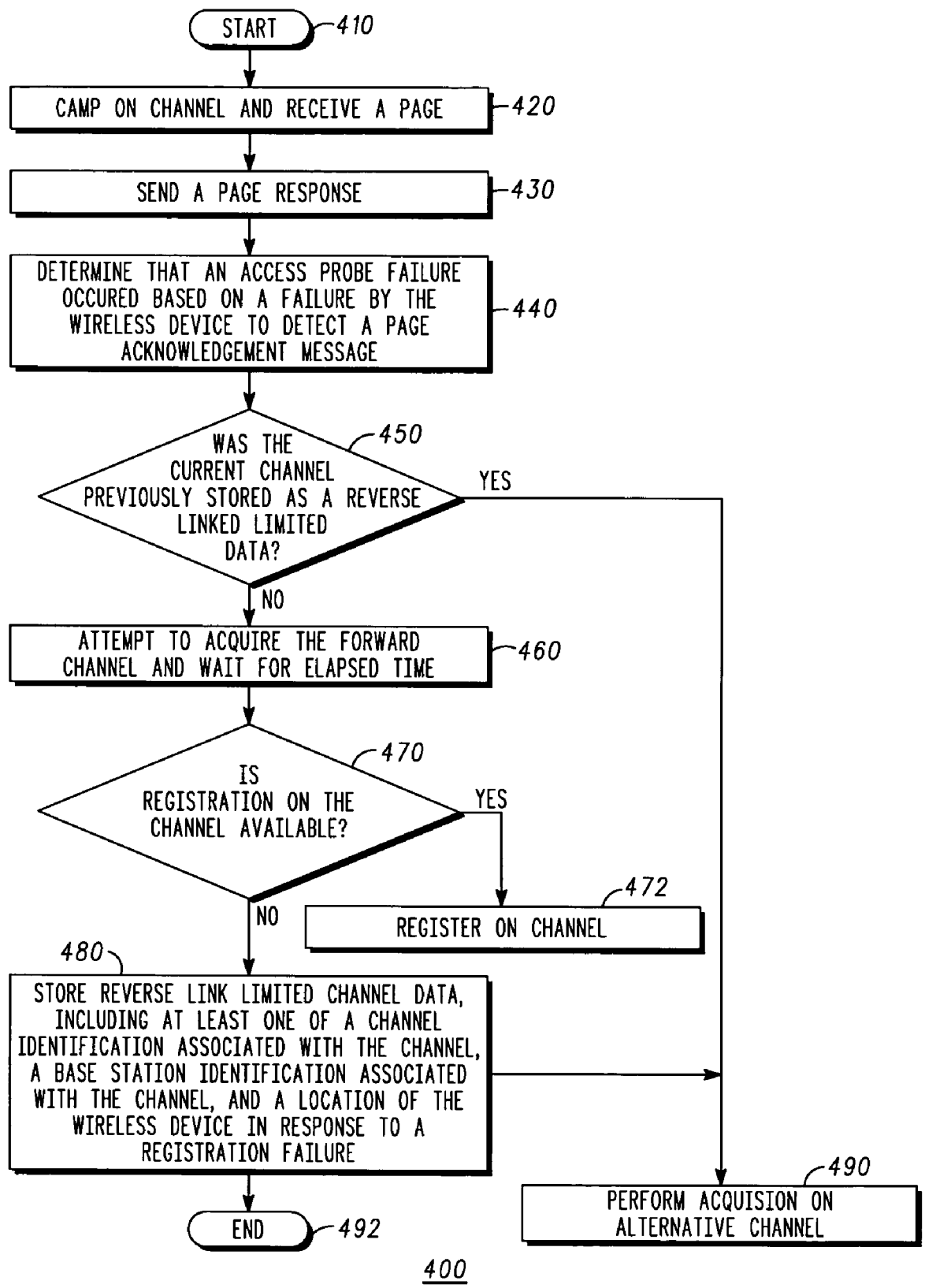
FIG. 4 is a block diagram illustrating another example of a wireless device for identifying a reverse link limited channel according to another embodiment of the invention.

A circuit and method employing logic circuitry and memory identifies a reverse link limited channel. The logic circuitry identifies a reverse link limited channel based on determining that an access probe failure occurred on a channel. An access probe failure occurs, for example, when the logic circuitry generates reverse channel messages for transmission to a base station, however the logic circuitry fails to receive an acknowledgement message on the channel, such as on the forward channel, in response to the reverse channel messages transmitted on the channel. The logic circuitry generates reverse link limited channel data in response to the logic circuitry determining that the access probe failure occurred. The reverse link limited channel data, for example, may be channel identification data associated with the channel, base station identification data associated with the channel, and location identification data, or any data suitable for identifying and adapting dynamically to the reverse link limited channel.

Among other advantages, the present invention allows the wireless device to obtain service in an area experiencing a reverse link limited condition by adapting dynamically to the reverse link limited channel. The logic circuitry may identify a reverse link limited channel by, for example, detecting an access probe failure. The reverse link limited condition may be confirmed by attempting to register the wireless device on the same channel that the access probe failure occurred. Once the logic circuitry has identified the reverse link limited channel, then the logic circuitry may take remedial steps in order to avoid communication on the reverse link limited channel. Additionally, the logic circuitry causes the memory to store the reverse link limited channel data in the memory for future use in identifying the reverse link limited channel. Further, the logic circuitry may select an appropriate alternative pilot signal for service as a result of identifying the reverse link limited channel previously stored.

The wireless device may provide service in an area previously identified as not providing service by a service provider because of a reverse link limited condition. For example, the logic circuitry may take appropriate action in response to detecting the reverse link limited channel by selecting an alternative communication channel. As a result, the wireless device may provide service in an area having a reverse link limited channel that previously did not provide service to the wireless device. Further yet, the wireless device may determine that the channel is no longer reverse link limited and may therefore acquire service on a more preferred system, such as a home system, rather than on a less preferred system, such as a roaming system. Accordingly, the wireless device may obtain service in an area associated with a reverse link limited channel by acquiring service on an appropriate alternative channel.

FIG. 1 is a block diagram of a circuit 2 for identifying a reverse link limited channel in accordance with at least one embodiment of the invention. The circuit 2 includes logic circuitry 30 to generate reverse link limited channel data 80. The logic circuitry 30 may be one or more suitably programmed processors, such as a microprocessor, a microcontroller, or a digital signal processor, and therefore includes associated memory, such as memory 40 (shown in FIG. 3), that contains executable instructions that when executed causes the logic circuitry 30 to carry out the operations described herein. In addition, logic circuitry 30, as used herein, includes discrete logic, state machines or any other suitable combination of hardware, software and/or firmware. The logic circuitry 30 receives forward channel messages 60 on the channel 64. Similarly, the logic circuitry 30 produces reverse channel messages 70 on the channel 64. The forward channel messages 60 may be any message received by the logic circuitry 30, such as system identification data 66 on a pilot channel, a paging message or an acknowledged paging response message. The channel 64 may refer to a single half duplex channel for providing forward and reverse communication.

The reverse channel messages 70 may be any message produced by the logic circuitry 30 for transmission, such as a page response message or a call origination message. The reverse link limited channel data 80 may be channel identification data associated with the channel 64, base station identification data associated with the channel 64, location identification data of the wireless device 10 or any data suitable for identifying a reverse link limited channel. As previously described, interference may cause a reverse link limited channel condition due to a high concentration of wireless devices in an area causing a high level of interference on the reverse link. Accordingly, the reverse link limited channel data 80 may be associated with interference on a particular frequency or communication channel. However, the interference on the reverse link limited channel may also be associated with a PN code, or a PN code offset as is known in the art.

The logic circuitry 30 determines if an access probe failure occurred on the channel 64. As is known in the art, an access probe sequence may include a procedure for attempting to transmit reverse channel messages initially at a lowest possible power level on the reverse channel. An access probe herein generally refers to any transmission by the wireless device 10 for attempting communication on the reverse channel 70 with the base station and therefore may include an access probe sequence. If the logic circuitry 30 fails to receive an acknowledgement of the access messages, then the logic circuitry 30 increases a power output level of the transmitted reverse channel messages in a sequential manner until an acknowledgement is transmitted by the base station and is also received by the logic circuitry 30. If, however, the transceiver 20 in the wireless device 10 transmits a message at a highest power level and no acknowledgement of the transmitted messages is received by the logic circuitry 30, then the logic circuitry 30 ends the access probe sequence. An access probe failure occurs when the maximum number of access probe sequences has been attempted and logic circuitry 30 fails to receive an acknowledgement to any of the access messages transmitted.

FIG. 2 illustrates a method 200 for identifying a reverse link limited channel in the circuit 2 described with respect to FIG. 1, according to one embodiment of the invention. The method 200 may be carried out by the circuit 2. However, any other suitable structure may also be used. It will be recognized that the method 200, beginning with step 210, will be described as a series of operations, but the operations may be performed in any suitable order and may be repeated in any suitable combination.

As shown in step 220, the logic circuitry 30 determines that an access probe failure on a channel occurred, based on a failure by the logic circuitry 30 to receive an acknowledgement on the channel 64, in response to transmitting access messages by the wireless device 10 on the channel 64. The following example may be used to illustrate how the logic circuitry 30 determines that an access probe failure occurred. Initially, the logic circuitry 30 may camp on a channel 64, such as the forward channel 62 (shown in FIG. 3), as part of the process of acquiring a base station via receiving and measuring pilot signal strengths of pilot signals transmitted by one or more wireless devices. While the logic circuitry 30 is camped on a channel, the logic circuitry 30 may receive a paging message on the paging channel. In response to receiving the paging message on the paging channel, the wireless device 10 sends a page response to the base station on the channel 64, such as the reverse channel 72. The logic circuitry 30 sends the page response as part of an access probe that attempts to send a message, such as the page response message. The access probe sequence includes a number of increasingly higher power transmission attempts if the previous access probe (i.e., the page response message sent from the wireless device 10 to the base station) does not result in the logic circuitry 30 receiving an acknowledgement message. If the logic circuitry 30 has sent the maximum number of attempts during the access probe sequence, and if the logic circuitry 30 does not receive an acknowledgement from the base station, then the logic circuitry 30 declares an access probe failure.

As shown in step 230, in response to the logic circuitry 30 determining that an access probe failure on the channel 64 occurred, the logic circuitry 30 stores the reverse link limited channel data 80. The reverse link limited channel data 80 may include any data suitable for identifying a reverse link limited channel, such as channel identification data associated with the reverse link limited channel, base station identification data associated with the reverse link limited channel, and location identification data. For example, a location associated with the location identification data may be provided by a global positioning system (GPS) device, or any device suitable for providing location information.

FIG. 3 is a block diagram of a wireless device 10 for identifying a reverse link limited channel in accordance with another embodiment of the invention. The wireless device 10 includes a transceiver 20, the logic circuitry 30, memory 40 and an antenna 50. The memory 40 contains the reverse link limited channel data 80. The memory 40 is coupled to the logic circuitry 30 to store the reverse link limited channel data 80. Alternatively, the memory 40 may be a part of the logic circuitry 30 or may be separate from the logic circuitry 30. The memory 40 may be, for example, random access memory (RAM), read only memory (ROM), optical memory, or any suitable storage medium located locally or remotely such as via a server. Additionally, the memory 40 may be accessible by a base station, switching system, or any suitable network element via the Internet, a wide access network (WAN), a local area network (LAN), a wireless wide access network (WWAN), a wireless local area network (WLAN), an IEEE 802.11 wireless network, a bluetooth network or any suitable communication interface or network.

The various elements of the wireless device 10 are linked by a plurality of links. The links may be any suitable mechanisms for conveying electrical signals or data as appropriate. The wireless device 10 may be a mobile telephone, a personal digital assistant (PDA), a wireless fidelity device (WiFi, i.e., a device based on the IEEE 802.11 specification), a blue tooth compliant device, or any suitable communication device.

The logic circuitry 30 receives the forward channel messages 60 on a forward channel 62 via the antenna 50 and the transceiver 20. As described herein, the channel 64, as shown in FIG. 1, may include a forward channel 62 and a reverse channel 72 to provide full duplex communication, as shown in FIG. 3. Similarly, the logic circuitry 30 produces reverse channel messages 70 on a reverse channel 72 via the antenna 50 and the transceiver 20. The forward channel messages 60 may be any message received by the logic circuitry 30, such as a paging message or an acknowledged paging response message.

FIG. 4 illustrates a method 400 for identifying a reverse link limited channel in response to a failure to register the wireless device 10 on the reverse channel 72 according to one embodiment of the invention. The method 400 may be carried out by the logic circuitry 30. However, any other suitable structure may also be used. It will also be recognized that the method 400 beginning with step 410 will be described as a series of operations. The operations may be performed in any suitable order that may be repeated in any suitable combination. The method 400 may be better understood with reference to FIG. 4.

As shown in step 420, the logic circuitry 30 may initially camp on the channel 64, such as the forward channel 62, for example, to monitor paging messages from a base station. As shown in step 430, the logic circuitry 30 sends a page response message to the base station on the reverse channel 62 in response to receiving a paging message.

As shown in step 440, the logic circuitry 30 determines that an access probe failure occurred based on a failure by the logic circuitry 30 to receive an acknowledgement message on the forward channel 62 in response to transmitting reverse channel messages 70 on the reverse channel 72. The transmitted reverse channel message 70 may be, as previously stated, a page response message, a call origination message, a registration request message, or any other suitable message. The acknowledgement message, as previously stated, may be an acknowledgement to any message type, such as an acknowledgement to a page response message, an acknowledgement to a call origination message, and an acknowledgement to a registration request message. The acknowledgement message is transmitted from the base station in conformance with a handshaking protocol as is known in the art.

As shown in step 450, the logic circuitry 30 determines if the current channel 64, such as the reverse channel 72, was previously identified as reverse link limited, causing memory 40 to store reverse link limited data 80. If the channel 64, such as reverse channel 72, was previously identified as reverse link limited and memory 40 contains the reverse link limited data 80, then, as shown in step 490, the logic circuitry 30 attempts to acquire an appropriate alternative channel. For example, logic circuitry 30 may select an alternative channel according to a roaming algorithm programmed in to the logic circuitry 30 as previously described, and as is known in the art. If the channel 64 was not previously stored in the memory 40 as reverse link limited data 80, then the logic circuitry 30 attempts to determine if the access probe failure occurred as a result of excessive propagation path loss on both the forward channel 62 and reverse channel 72 or if only the reverse channel 72 is impaired.

According to another embodiment, the logic circuitry 30 determines if the current reverse channel 72 was previously identified as reverse link limited by comparing the location of the wireless device 10 with a location of the wireless device 10 associated with a previously established reverse link limited condition and stored in memory 40. Accordingly, if the wireless device 10 is currently in an area previously established as reverse link limited, then the logic circuitry 30 does not attempt to register the wireless device 10 on the current reverse channel 72 at step 470, since doing so will likely result in a registration failure. Accordingly, the logic circuitry 30 may take any suitable remedial measures at step 490, such as searching for another appropriate pilot signal, either within the current system or outside of another system (i.e., roaming), in response to detecting the reverse link limited channel.

As shown in step 460, the logic circuitry 30 attempts to acquire a base station identification message such as system identification data 66 on the forward channel 62 by the logic circuitry 30 in response to the logic circuitry 30 determining that the access probe failed on the channel 64. For example, in the event a reverse link limited condition occurs, due to, for example, excessive interference on the reverse channel 72, the wireless device 10 will still be capable of receiving messages on the forward channel 62. Accordingly, the wireless device 10 will likely be able to acquire and camp on the forward channel 62 in order to receive overhead message traffic on the paging channel even though the reverse channel 72 link is impaired. At this point, the logic circuitry 30 may determine that since the logic circuitry 30 may acquire the forward channel 62, the forward channel 62 is not forward channel limited. Since the logic circuitry 30 did not previously receive an acknowledgement in response to an access probe, then the likely cause of the access probe failure may be a reverse link limited condition. Consequently, if the wireless device 10 is experiencing the reverse link limited condition, one of two possibilities exists: the wireless device 10 is experiencing either a temporary reverse channel failure or a long-term reverse channel failure.

According to one embodiment, as part of the acquisition process of step 460 the wireless device 10 receives a signal quality metric associated with a message such as the system identification data 66 received on the forward channel 62 of the channel. If the quality metric associated with the forward channel messages 60 is less than a threshold level, then the logic circuitry 30 does not store the reverse link limited channel data 80 in the memory 40. Accordingly, if the signal quality metric indicates a strong received signal on the forward channel 62, and if an acknowledgement is not received on the reverse channel 62, then there is a strong likelihood that the reverse channel 62 is reverse link limited. However, if the signal quality metric associated with the forward channel messages is poor, then the likely cause of the failure to receive an acknowledgement may be excessive path loss, and not only a reverse link limited condition. As a result, if the signal quality metric associated with the forward channel message is below a threshold level, then the reverse link limited channel data 80 is not stored in the memory 40 since the forward channel 62 may be impaired or limited as well as the reverse link 72. According to one embodiment, the signal quality metric is a received quality indication (RXQUAL) that indicates, for example, a bit error rate, a frame error rate, or any suitable quality metric associated with the received forward channel messages 60. Since the wireless device 10 is likely attempting acquisition on a relatively weak pilot signal, the wireless device 10 may attempt acquisition on a stronger pilot as is known in the art.

As shown in step 460, if the logic circuitry 30 acquires the appropriate pilot signal on the forward channel 72, then logic circuitry 30 waits for an elapsed period of time in order to allow the wireless device 10 to pass through the reverse link limited area. According to one embodiment, the elapsed period of time may be selected such that the wireless device 10 has an opportunity to either move away from the area experiencing the reverse link limited condition, or the wireless device 10 may relocate to a coverage area where a different base station may be acquired. For example, the elapsed period of time may be a fraction of a second, a number of seconds such as two, four, eight, ten or more seconds, or any suitable amount of time. However, if the logic circuitry 30 fails to acquire the appropriate pilot signal on the forward channel 62 at step 460, then the registration attempt at step 470 will fail and processing will continue to step 480.

As shown in step 470, in response to the logic circuitry 30 attempting to acquire the base station identification message on the forward channel 62, and after an elapsed period of time, the logic circuitry 30 attempts to register the wireless device 10 by transmitting a registration message on the reverse channel 72. The attempt to register the wireless device 10 on the reverse channel 72 will, in effect, test the reverse channel 72 to determine if the reverse channel 72 limited condition still exists since the access probe failure occurred. Additionally, the logic circuitry 30 attempts to register the wireless device 10 in order to reselect a strongest pilot signal, since the wireless device 10 may have moved out of the coverage area of the previous base station and into the coverage area of another base station.

As shown in step 472, if logic circuitry 30 determined that registration is available on the desired channel 64, then logic circuitry 30 registers on the desired channel 64. The logic circuitry 30 may attempt to register the wireless device 10 by any suitable type of registration. For example, the registration type may be a power up registration, a parameter change registration, a timer based registration, a zoned based registration, a distance based registration, or any other suitable type of registration.

As shown in step 480, the logic circuitry 30 stores the reverse link limited channel data 80 in response to the logic circuitry 30 detecting a failure to register the wireless device 10 on the reverse channel 72. For example, the logic circuitry 30 may determine that the registration attempt failed by failing to receive a registration acknowledgement message transmitted by the base station to the wireless device 10 on the forward link 62.

The reverse link limited channel data 80 may be stored within the memory 40 for any suitable length or period of time to allow the logic circuitry 30 to adapt to the reverse link limited channel at a later time. For example, the logic circuitry 30 may clear the reverse link limited channel data 80 stored in the memory 40 if the wireless device 10 is powered down. However, any trigger or period of time may be used to determine when the logic circuitry 30 clears the reverse link limited channel data stored in the memory 40.

Among other advantages, the present invention allows the wireless device 10 to obtain service in an area experiencing a reverse link limited condition by adapting dynamically to the reverse link limited channel. The logic circuitry 30 may identify a reverse link limited channel by, for example, detecting an access probe failure. The reverse link limited condition may be confirmed by attempting to register the wireless device 10 on the same channel on which the access probe failure occurred. Once the logic circuitry 30 has identified the reverse link limited channel, then the logic circuitry 30 may take remedial steps in order to avoid communication on the reverse link limited channel. Additionally, the logic circuitry 30 causes the memory 40 to store the reverse link limited channel data 80 in the memory 40 for future use in identifying the reverse link limited channel. Further, the logic circuitry 30 may select an appropriate alternative pilot signal for service as a result of identifying the reverse link limited channel previously stored.

The wireless device 10 may provide service in an area previously identified as not providing service by a service provider because of a reverse link limited condition. For example, the logic circuitry 30 may take appropriate action in response to detecting the reverse link limited channel by selecting an alternative communication channel. As a result, the wireless device 10 may provide service in an area having a reverse link limited channel that previously did not provide service to the wireless device. Further yet, the wireless device 10 may determine that the reverse channel 62 is no longer reverse link limited and may therefore acquire service on a more preferred system, such as a home system rather than on a less preferred system, such as a roaming system. Accordingly, the wireless device 10 may obtain service in an area associated with a reverse link limited channel by acquiring service on an appropriate alternative channel.

It is understood that the implementation of other variations and modifications of the invention and its various aspects will be apparent to those of ordinary skill in the art and that the invention is not limited by the specific embodiments described. It is therefore contemplated to cover the present modifications, variations or equivalents that fall within the spirit and scope of the basic underlying principles disclosed and claimed herein.

What is claimed is:

1. A circuit operative to acquire system identification data broadcast on a channel, comprising:

logic circuitry operative to determine that an access probe failure occurred on the channel based on a failure to detect an acknowledgement message on the channel in response to a reverse channel message produced for transmission on the channel; and in response to the access probe failure determined on the channel, the logic circuitry is operative to generate reverse link limited channel data including at least one of: channel identification data associated with the channel, base station identification data associated with the channel, and location identification data.

2. The circuit of claim 1 wherein a wireless device includes the circuit and wherein the logic circuitry is operative to attempt to register the wireless device with a base station on the channel in response to at least one of: the determined access probe failure, an attempt to acquire the system identification data broadcast on the channel, and an elapsed period of time.

3. The circuit of claim 2 wherein the logic circuitry is operative to not attempt to register the wireless device with the base station on the channel if at least one of: a current location of the wireless device is in close proximity to a location associated with the location identification data, the reverse link limited channel data was generated, and a signal quality metric associated with the system identification data broadcast on the channel is less than a threshold level.

4. A wireless device operative to acquire system identification data broadcast on a channel, comprising:
 logic circuitry operative to determine that an access probe failure occurred on the channel based on a failure to detect an acknowledgement message on the channel in response to a reverse channel message produced for transmission on the channel; and in response to the access probe failure determined on the channel, the logic circuitry operatively generates reverse link limited channel data including at least one of: channel identification data associated with the channel, base station identification data associated with the channel, and location identification data; and
 memory, operatively coupled to the logic circuitry, containing the reverse link limited channel data.

5. The wireless device of claim 4 wherein the logic circuitry is operative to attempt to acquire the system identification data broadcast on the channel in response to the access probe failure determined by the logic circuitry.

6. The wireless device of claim 4 wherein the logic circuitry is operative to attempt to register the wireless device on the channel in response to at least one of: the determined access probe failure, an attempt to acquire the system identification data broadcast on the channel, and an elapsed period of time.

7. The wireless device of claim 6 wherein the logic circuitry is operative to attempt to register the wireless device by at least one of a power up registration, parameter change registration, timer based registration, zone based registration, and distance based registration.

8. The wireless device of claim 6 wherein the logic circuitry is operative to not attempt to register the wireless device on the channel if at least one of: a current location of the wireless device is in close proximity to a location associated with the location identification data contained in the memory, the memory contains the reverse link limited data, and a signal quality metric associated with the system identification data broadcast on the channel is less than a threshold level.

9. The wireless device of claim 4 wherein the logic circuitry clears the reverse link limited channel data stored in the memory if the wireless device powers down.

10. A wireless device operative to acquire system identification data broadcast on a channel comprising:
 a transceiver operative to receive forward channel messages on at least a forward channel, and operative to transmit reverse channel messages on at least a reverse channel;
 logic circuitry, operatively coupled to the transceiver, and operative to detect the forward channel messages from the transceiver and to provide the reverse channel messages to the transceiver, and operative to determine that an access probe failure occurred based on a failure to detect an acknowledgement message on the forward channel in response to the reverse channel messages transmitted on the reverse channel; and in response to the access probe failure determined on the channel, the logic circuitry is operative to attempt to register the wireless device with a base station, and the logic circuitry is operative to generate reverse link limited channel data including at least one of: a channel identification data associated with the channel, base station identification data associated with the channel, and location identification data; and
 memory, operatively coupled to the logic circuitry, containing the reverse link limited channel data received from the logic circuit, in response to a failure to register the wireless device with the base station on the reverse channel.

11. The wireless device of claim 10 wherein the logic circuitry clears the reverse link limited channel data stored in the memory if the wireless device powers down.

12. The wireless device of claim 10 wherein the logic circuitry is operative to not attempt to register the wireless device on the channel if at least one of: a current location of the wireless device is in close proximity to a location associated with the location identification data, the memory contains the reverse link limited channel data, and a signal quality metric associated with at least one of the received forward channel messages is less than a threshold level.

13. Memory containing instructions executable by one or more processing devices that causes the one or more processing devices to:
 determine that an access probe failure occurred on a channel, based on a failure to detect an acknowledgement message on the channel in response to a reverse channel message produced for transmission on the channel; and
 generate reverse link limited channel data including at least one of: channel identification data associated with the channel, base station identification data associated with the channel, and location identification data associated with a wireless device, in response to the determined access probe failure.

14. The memory of claim 13 containing executable instructions that cause the one or more processing devices to attempt to register the wireless device with a base station on the channel in response to at least one of: the determined access probe failure, an attempt to acquire system identification data broadcast on the channel, and an elapsed period of time.

15. The memory of claim 14 containing executable instructions that cause the one or more processing devices to not attempt to register the wireless device on the channel if at least one of: a current location of the wireless device is in close proximity to a location associated with the location identification data, the reverse link limited data was generated, and a signal quality metric associated with the system identification data broadcast on the channel is less than a threshold level.

16. A method in a wireless device to acquire system identification data broadcast on a channel comprising:
 determining that an access probe failure on a channel occurred, based on a failure to detect an acknowledgement message on the channel in response to transmitting reverse channel messages by the wireless device on the channel; and
 generating reverse link limited channel data, including at least one of: channel identification data associated with the channel, base station identification data associated with the channel, and location identification data, in response to determining that the access probe failure on the channel occurred.

17. The method in the wireless device of claim 16 further including attempting to acquire the system identification data broadcast on the channel in response to determining that the access probe failure on the channel occurred.

18. The method in the wireless device of claim 17 further including attempting to register the wireless device with a base station on the channel in response to at least one of: determining that the access probe failure on the channel occurred, attempting to acquire the system identification data broadcast on the channel, and an elapsed period of time.

19. The method in the wireless device of claim 18 wherein attempting to register the wireless device includes at least one of a power up registration, a parameter change registration, a timer based registration, a zone based registration, and a distance based registration.

20. The method in the wireless device of claim 18 further including not attempting to register the wireless device on the channel if at least one of: a current location of the wireless device is in close proximity to a location associated with the location identification data, the reverse link limited channel data was generated, and a signal quality metric associated with the system identification data broadcast on the channel is less than a threshold level.

21. A method in a wireless device to acquire system identification data broadcast on a channel comprising:

determining that an access probe failure occurred, based on a failure to receive an acknowledgement message on a forward channel in response to transmitting reverse channel messages by the wireless device on a reverse channel;

attempting to acquire the system identification data broadcast on the forward channel by the wireless device in response to determining the access probe failure on the channel occurred and if the forward channel was not previously identified as reverse link limited;

attempting to register the wireless device in response to at least one of: determining that the access probe failure on the channel occurred, attempting to acquire the system identification data broadcast on the channel, and an elapsed period of time; and storing reverse link limited channel data including at least one of: channel identification data associated with the channel, base station identification data associated with the channel, and location identification data, in response to a failure to register the wireless device on the reverse channel.

22. The method in the wireless device of claim 21 further including not attempting to register the wireless device on the channel if at least one of: a current location of the wireless device is in close proximity to a location associated with the location identification data, the reverse link limited channel data was generated, and a signal quality metric associated with the system identification data broadcast on the channel is less than a threshold level.

* * * * *